(12) United States Patent
Hua

(10) Patent No.: US 8,247,102 B2
(45) Date of Patent: Aug. 21, 2012

(54) STANDABLE PORTABLE ELECTRONIC DEVICE

(75) Inventor: Wei-Bin Hua, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 790 days.

(21) Appl. No.: 12/409,035

(22) Filed: Mar. 23, 2009

(65) Prior Publication Data
US 2009/0291357 A1 Nov. 26, 2009

(30) Foreign Application Priority Data
May 20, 2008 (CN) .......................... 2008 1 0301675

(51) Int. Cl.
*H01M 2/10* (2006.01)
(52) U.S. Cl. .................. 429/96; 429/100; 455/575.1
(58) Field of Classification Search .................. 368/278, 368/316, 317; 455/575.1, 575.4, 575.8; 429/100, 429/96, 97, 98; 224/902
See application file for complete search history.

(56) References Cited

U.S. PATENT DOCUMENTS

| | | | | |
|---|---|---|---|---|
| 2,125,294 | A * | 8/1938 | Lathrop | 368/317 |
| 2,158,155 | A * | 5/1939 | Roy | 368/316 |
| 4,491,425 | A * | 1/1985 | Young-Koo | 368/317 |
| 5,072,330 | A * | 12/1991 | Fuqua | 361/679.01 |
| 6,054,839 | A * | 4/2000 | Guimier et al. | 320/113 |
| 6,225,777 | B1 * | 5/2001 | Garcia et al. | 320/112 |
| 6,284,407 | B1 * | 9/2001 | Murray et al. | 429/186 |
| 6,443,615 | B1 * | 9/2002 | Chan | 368/316 |
| 6,452,795 | B1 * | 9/2002 | Lee | 361/679.41 |
| 6,754,514 | B1 * | 6/2004 | Nakamura | 455/575.3 |
| 7,206,196 | B2 * | 4/2007 | Ghosh et al. | 361/679.09 |
| 7,218,731 | B2 * | 5/2007 | Turunen | 379/433.12 |
| 7,308,290 | B2 * | 12/2007 | Johnson et al. | 455/575.1 |
| 7,369,882 | B2 * | 5/2008 | Hwang et al. | 455/575.1 |
| 7,488,554 | B2 * | 2/2009 | Wang et al. | 429/100 |
| 7,488,555 | B2 * | 2/2009 | Chen et al. | 429/100 |
| 8,077,854 | B2 * | 12/2011 | Ou et al. | 379/330 |
| 2002/0068532 | A1 * | 6/2002 | Wong et al. | 455/90 |
| 2002/0183017 | A1 * | 12/2002 | Mujica | 455/90 |
| 2004/0005138 | A1 * | 1/2004 | Yano et al. | 386/46 |
| 2004/0191614 | A1 * | 9/2004 | Iwasaki et al. | 429/96 |
| 2005/0277451 | A1 * | 12/2005 | Ku | 455/575.4 |
| 2006/0056143 | A1 * | 3/2006 | Tatsukami et al. | 361/683 |
| 2007/0122693 | A1 * | 5/2007 | Qin et al. | 429/97 |
| 2009/0017883 | A1 * | 1/2009 | Lin | 455/575.8 |
| 2009/0261216 | A1 * | 10/2009 | Yang et al. | 248/168 |
| 2010/0002129 | A1 * | 1/2010 | Zhou | 348/374 |
| 2010/0005552 | A1 * | 1/2010 | Nakayama et al. | 850/6 |
| 2010/0142130 | A1 * | 6/2010 | Wang et al. | 361/679.01 |
| 2010/0159997 | A1 * | 6/2010 | Wang | 455/566 |
| 2010/0210324 | A1 * | 8/2010 | Xu | 455/575.1 |
| 2011/0111813 | A1 * | 5/2011 | Yoon | 455/575.4 |

FOREIGN PATENT DOCUMENTS

CN 2624537 Y 7/2004

* cited by examiner

*Primary Examiner* — Yogendra Gupta
*Assistant Examiner* — Emmanuel S Luk
(74) *Attorney, Agent, or Firm* — Altis Law Group, Inc.

(57) ABSTRACT

A portable electronic device includes a main body and a battery cover. The main body defines a recess for receiving a battery therein. The battery cover is installed on the main body to cover the recess when the portable electronic device is in a first use mode, and the battery cover is detached from the main body, placed flatly, and used to stand the main body erectly thereon when the portable electronic device is in a second use mode.

11 Claims, 4 Drawing Sheets

STANDABLE PORTABLE ELECTRONIC DEVICE

BACKGROUND

1. Field of the Invention

The present invention relates to portable electronic devices, particularly to a portable electronic device having a built-in stand.

2. Description of Related Art

Nowadays, many portable electronic devices such as mobile phones and personal digital assistants (PDA) are designed to be multifunctional. For example, a mobile phone may be provided with the functions of audio communication, capturing photos, playing music and videos, etc.

When a portable electronic device is used to capture photos or playing music, users may want to set down the portable electronic device for self-portrait and etc. However, the bottom surface of a conventional portable electronic device is usually small, thus it is difficult for it to stand on its own. Some portable electronic devices can be stably stood by additional brackets, but fabricating and carrying the brackets can be burdensome.

Therefore, there is room for improvement within the art.

BRIEF DESCRIPTION OF THE DRAWINGS

Many aspects of the present portable electronic device can be better understood with reference to the following drawings. The components in the various drawings are not necessarily drawn to scale, the emphasis instead being placed upon clearly illustrating the principles of the present portable electronic device. Moreover, in the drawings, like reference numerals designate corresponding parts throughout the diagrams.

DETAILED DESCRIPTION OF THE EMBODIMENT

Figure 1:
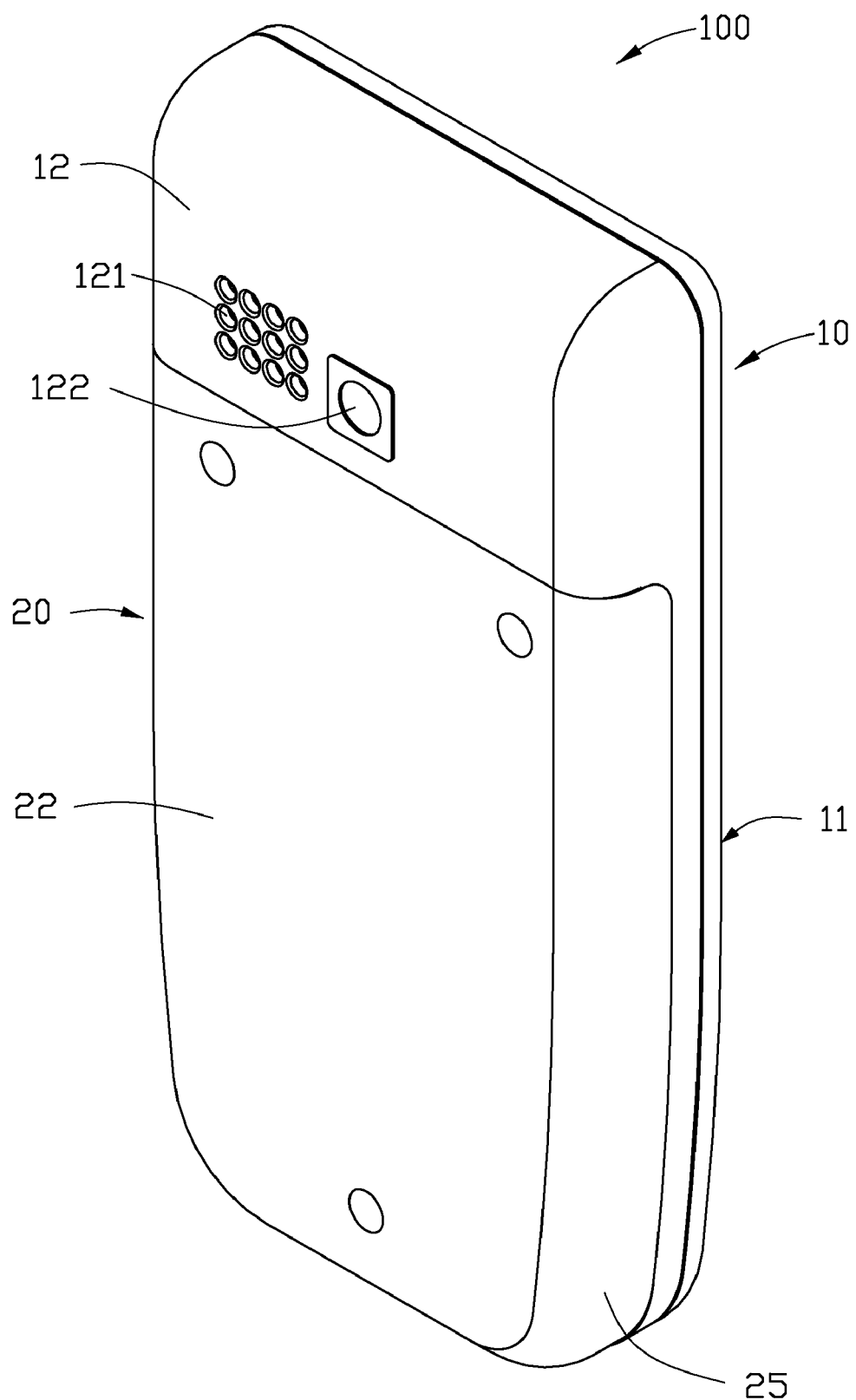
FIG. 1 is a schematic view of a portable electronic device, according to a first exemplary embodiment.
Figure 2:
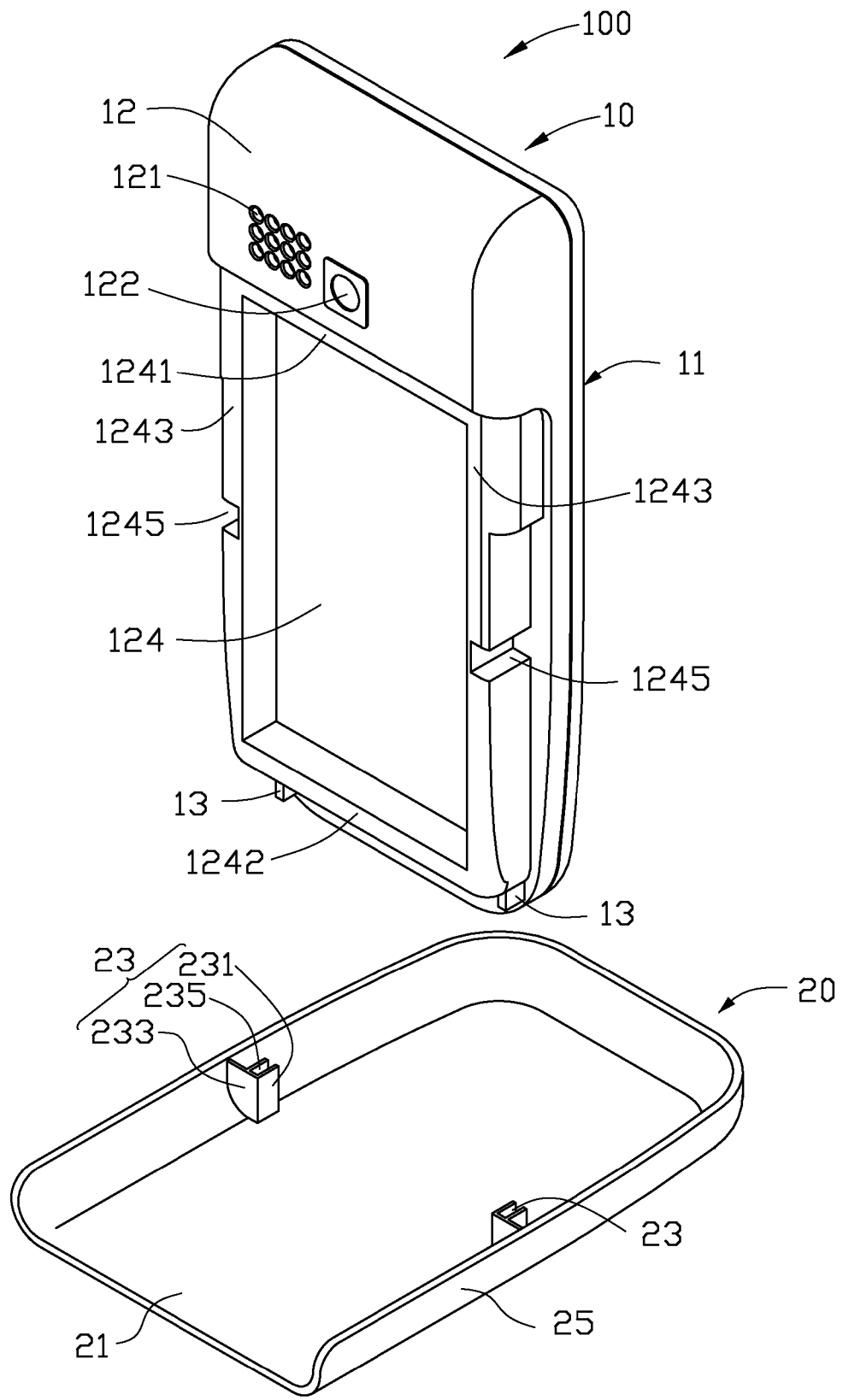
FIG. 2 is a disassembled view of the portable electronic device shown in FIG. 1.

FIGS. 1 and 2 show a portable electronic device 100 according to a first exemplary embodiment. While the exemplary portable electronic device 100 is a mobile phone, it can also be a personal digital assistant (PDA), a digital camera, etc. The portable electronic device 100 includes a main body 10 and a battery cover 20 installed on the main body 10.

The main body 10 is an approximately cuboid housing, which includes a first surface 11 and an opposite second surface 12. Typical keypads and display (not shown) of the portable electronic device can be disposed on the first surface 11. A projector unit 121 and a camera module 122 are disposed on a portion of the second surface 12. Another portion of the second surface 12 defines a rectangular recess 124 in the main body 10 for receiving a battery (not shown). The recess 124 is formed by a top wall 1241, a bottom wall 1242 and two side walls 1243 surrounding the recess 124. Each side wall 1243 defines a gap 1245 in a middle portion thereof. The main body 10 further includes two retaining pins 13 protruding from two ends of an outer surface of the bottom wall 1242 and extending parallel to the first surface 11 and the second surface 12.

The battery cover 20 is approximately rectangular and includes an inner surface 21 and an opposite outer surface 22. The battery cover 20 has two sides and an end between the two sides, which all extend approximately perpendicularly to the inner surface 21, thereby forming a U-shaped frame 25 perpendicularly connected to the periphery of the inner surface 21. The frame 25 has an inner shape corresponding to the outer shapes of the top wall 1241, the side walls 1243 and the bottom wall 1242, such that the battery cover 20 can engage with the main body 10 to cover the recess 124. The battery cover 20 further includes two opposite retainers 23 formed on the inner surface 21. The positions of the two retainers 23 respectively correspond to the two gaps 1245 of the main body 10. Each retainer 23 includes a connecting wall 233 and two retaining walls 231, which are all perpendicularly connected to the inner surface 21. The two retaining walls 231 are both connected to a same side of the connecting wall 233, thereby forming a retaining aperture 235 between the two retaining walls 231. The shapes and dimensions of the retaining apertures 235 correspond to the shapes and dimensions of the retaining pins 13. The two connecting walls 233 respectively connect to two opposite sides of the frame 25 and extend towards each other, and the retaining walls 231 of each retainer 23 all extend in a same direction, such that the two retainers 23 can be respectively received in the two gaps 1245.

When the portable electronic device 100 is in a common use mode, the battery cover 20 cover the recess 124 and the battery (not shown) received therein, the retainers 23 are received in the gaps 1245, and the frame 25 engage with the top wall 1241, the bottom wall 1242 and the side walls 1243 to secure the battery cover 20 on the main body 10. Understandably, conventional latching devices (not shown) can also be added to the portable electronic device 100 to secure the battery cover 20.

Figure 3:
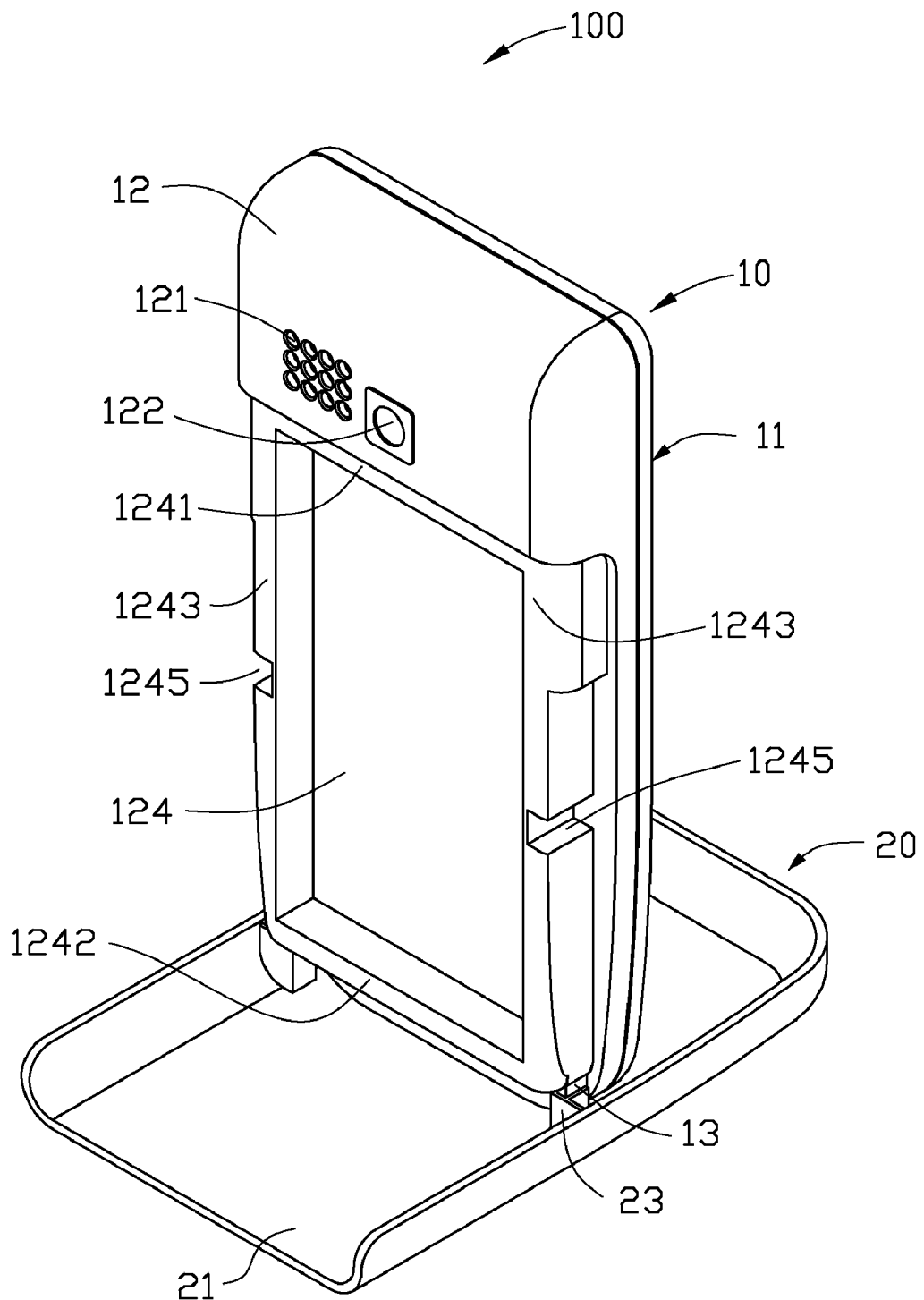
FIG. 3 is a schematic view of the portable electronic device shown in FIG. 1 standing on its own.

Also referring to FIG. 3, when the portable electronic device 100 is in a special use mode, such as being used to capture photos or playing videos, it may be desired to be placed in an upright position to get the maximum performance out of it. To do that, the battery cover 20 is detached from the main body 10 and placed flatly, with the inner surface 21 facing up. The retaining pins 13 are respectively inserted into the retaining apertures 235 and held by the retainer 23, thus the portable electronic device 100 can be securely and perpendicularly mounted to the batter cover 20 and stood stably, without any additional brackets.

Understandably, the retainers 23 can be formed on other portions of the inner surface 21 or configured to be in other shapes, as long as the retaining pins 13 can be inserted in the retainers 23 to be positioned perpendicularly to the inner surface 21. One of the retainers 23, the gaps 1245 and the retaining pins 13 can also be omitted.

Figure 4:
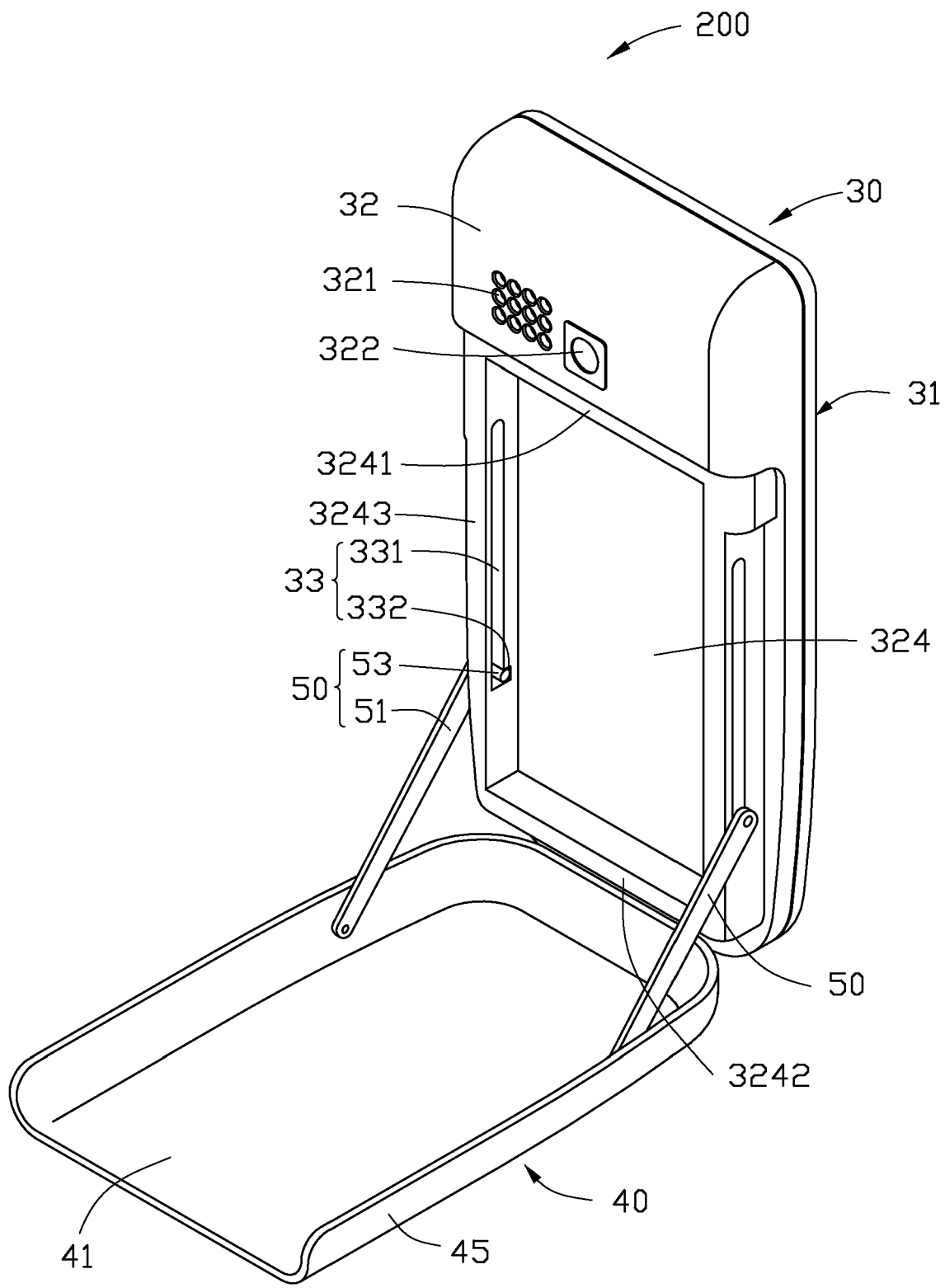
FIG. 4 is a schematic view of a portable electronic device, according to a second exemplary embodiment, standing on its own.

FIG. 4 shows a portable electronic device 200 according to a second exemplary embodiment. The exemplary portable electronic device 200 is again a mobile phone including a main body 30 and a battery cover 40 rotatably installed on the main body 30.

The main body 30 is similar to the main body 10, including a first surface 31 and an opposite second surface 32. A projector unit 321 and a camera module 322 are disposed on a portion of the second surface 12. Another portion of the second surface 32 recesses to define a rectangular recess 324 in the main body 10 for receiving the battery (not shown) of the portable electronic device 300, thereby forming a top wall 3241, a bottom wall 3242 and two side walls 3243 surrounding the recess 324. The battery cover 40 is similar to the battery cover 20, including an inner surface 41 and an opposite outer surface (not shown). The battery cover 40 has two sides and an end between the two sides, which all extend approximately perpendicularly to the inner surface 41, thereby forming a U-shaped frame 45 perpendicularly connected to the periphery of the inner surface 41. The frame 45 has an inner shape corresponding to the outer shapes of the top wall 3241, the side walls 3243 and the bottom wall 3242, such that the battery cover 40 can engage with the main body 30 to cover the recess 324. All above-mentioned components of the portable electronic device 100 are respectively similar to their corresponding components of the portable electronic device 100.

The main differences between the portable electronic device 200 and the portable electronic device 100 are described as follows. Two leading grooves 33 are respectively defined in the two side walls 3243. Each leading groove 33 includes a sliding portion 331 and a retaining portion 332 communicating with an end of the sliding portion 331. The sliding portions 331 are straight grooves extending along the side wall 3243 and parallel to the first surface 31 and the second surface 32. An end of each sliding portion 331 towards the bottom wall 3242 extends perpendicularly to the sliding portion 331 and towards the direction of the first surface 31, thereby forming a retaining portion 332. Thus, the leading grooves 33 are configured to be approximately L-shaped.

The portable electronic device 200 further includes two connecting members 50. Each connecting members 50 includes a straight connecting pole 51 and a sliding pin 53 perpendicularly connected to an end of the connecting pole 51. The two sliding pins 53 are respectively received in the two leading grooves 33 and can slide along the leading grooves 33. Another end of the connecting pole 51 opposite to the sliding pin 53 is rotatably connected to the battery cover 40 by typical methods, such as hinges. Thus, the battery cover 40 is rotatably connected to the main body 30 by the connecting members 50.

When the portable electronic device 200 is in the common use mode, the battery cover 40 cover the recess 324 and the battery (not shown) received therein. The connecting poles 51 are placed parallel to the sliding portions 331 and the inner surface 41. The sliding pins 53 are positioned in the ends of the sliding portions 331 opposite to the retaining portions 332 and towards the top wall 3241.

When the portable electronic device 200 in the special use mode, placed in a upright position, the battery cover 40 is detached from the main body 30 and the sliding pins 53 are slid along the leading grooves 33. When the sliding pins 53 arrive at the retaining portions 332, they are pushed towards the direction of the first surface 31 and then retained in the retaining portions 332. The battery cover 40 is then rotated to be approximately perpendicular to the main body 30 and placed flatly on its outer surface (not shown). Thus, the main body 30 is placed in a upright position and held by the connecting members 50 and the battery cover 40.

Understandably, the portable electronic device 300 can also be stood stably without any additional brackets. One of the leading grooves 33 and one of the connecting members 50 can also be omitted.

In the exemplary embodiments, both the portable electronic devices 100 and 200 can be placed in a upright position by their conventional battery covers 20/40 without any additional bracket. Therefore, the portable electronic devices 100 and 200 can be in better working positions for different purposes, without increasing any cost and work.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A portable electronic device, comprising:
    a main body defining a recess for receiving a battery and at least one gap therein, the main body including at least one retaining pin; and
    a battery cover including at least one retainer, wherein in a first use mode, the battery cover is installed on the main body and substantially parallel to the main body to cover the recess, and the retainer is received in the gap; and in a second use mode, the battery cover is detached from the main body, placed flatly and substantially perpendicular to the main body, and the retaining pin is inserted in the retainer to erectly stand the main body on the battery cover.

2. The portable electronic device as claimed in claim 1, wherein the main body includes a top wall, a bottom wall and two side walls surrounding the recess, and the battery cover has an inner shape corresponding to the outer shapes of the top wall, the bottom wall and the side walls such that the battery cover engages with the main body to cover the recess.

3. The portable electronic device as claimed in claim 2, wherein the retainer is formed in an inner surface of the battery cover and at least one side wall defines a gap therein, the retainer being received in the gap when the portable electronic device is in the first use mode.

4. The portable electronic device as claimed in claim 3, wherein the main body further includes at least one retaining pin protruding from an outer surface of the bottom wall.

5. The portable electronic device as claimed in claim 4, wherein the retainer defines a retaining aperture corresponding to the retaining pin therein, and the retaining pin being erectly inserted into the retaining aperture to stand the main body on the battery cover placed flatly when the portable electronic device is in the second use mode.

6. The portable electronic device as claimed in claim 5, wherein each retainer includes a connecting wall and two retaining walls, the connecting wall and the two retaining walls are all perpendicularly connected to the inner surface of the battery cover, and the two retaining walls are both connected to a same side of the connecting wall, thereby forming the retaining aperture between the two retaining walls.

7. A portable electronic device, comprising:
    a main body defining a recess for receiving a battery and at least one gap therein;
    a battery cover detachably installed on the main body to cover the recess and including at least one retainer corresponding to the gap; and
    at least one retaining pin protruding from the main body and also corresponding to the retainer; wherein the retainer is received in the gap when the battery cover is placed substantially parallel to the main body and covers the recess, and the main body is placed substantially perpendicularly to the detached battery cover when the retaining pin is held by the retainer.

8. The portable electronic device as claimed in claim 7, wherein the main body includes a top wall, a bottom wall and two side walls surrounding the recess, and the battery cover has an inner shape corresponding to the outer shapes of the top wall, the bottom wall and the side walls such that the battery cover engages with the main body to cover the recess.

9. The portable electronic device as claimed in claim 8, wherein the gap is defined in either of the two side walls.

10. The portable electronic device as claimed in claim 9, wherein the retainer defines a retaining aperture corresponding to the retaining pin therein, and the main body is stood on the battery cover placed flatly when the retaining pin is erectly inserted into the retaining aperture.

11. The portable electronic device as claimed in claim 10, wherein each retainer includes a connecting wall and two retaining walls, the connecting wall and the two retaining walls are all perpendicularly connected to a same surface of the battery cover, and the two retaining walls are both connected to a same side of the connecting wall, thereby forming the retaining aperture between the two retaining walls.

* * * * *